(12) United States Patent
Gang et al.

(10) Patent No.: US 10,969,807 B2
(45) Date of Patent: Apr. 6, 2021

(54) IN-LINE POWER CONDITIONING FOR MULTI-DROP DATA BUS

(71) Applicant: Simmonds Precision Products, Inc., Vergennes, VT (US)

(72) Inventors: Travis Gang, Hinesburg, VT (US); Benjamin D. McBride, South Burlington, VT (US)

(73) Assignee: Simmonds Precision Product, Inc., Vergennes, VT (US)

( * ) Notice: Subject to any disclaimer, the term of this patent is extended or adjusted under 35 U.S.C. 154(b) by 387 days.

(21) Appl. No.: 15/928,765

(22) Filed: Mar. 22, 2018

(65) Prior Publication Data
US 2019/0294188 A1  Sep. 26, 2019

(51) Int. Cl.
| | |
|---|---|
| H02M 3/00 | (2006.01) |
| G05F 1/46 | (2006.01) |
| H02H 9/04 | (2006.01) |
| H02J 1/02 | (2006.01) |
| B64D 47/00 | (2006.01) |
| H02J 1/10 | (2006.01) |

(52) U.S. Cl.
CPC .................. *G05F 1/46* (2013.01); *H02H 9/04* (2013.01); *H02J 1/02* (2013.01); *H02M 3/00* (2013.01); *B64D 47/00* (2013.01); *B64D 2221/00* (2013.01); *H02J 1/10* (2013.01)

(58) Field of Classification Search
CPC ...... G05F 1/46; H02H 9/04; H02J 1/02; H02J 1/00; H02M 3/00; B64D 47/00
USPC ......................................................... 307/31
See application file for complete search history.

(56) References Cited

U.S. PATENT DOCUMENTS

| | | | | |
|---|---|---|---|---|
| 6,459,175 B1 * | 10/2002 | Potega | ................ | H02J 7/00041 307/149 |
| 2002/0012401 A1 | 1/2002 | Karolys et al. | | |
| 2003/0052540 A1 | 3/2003 | Bedouet et al. | | |
| 2003/0085621 A1 * | 5/2003 | Potega | .................... | G06F 1/263 307/18 |

(Continued)

FOREIGN PATENT DOCUMENTS

| | | |
|---|---|---|
| EP | 1373045 | 1/2004 |
| EP | 2684270 | 1/2014 |

(Continued)

OTHER PUBLICATIONS

Extended European Search Report for European Patent Application No. 19161347.0 dated Apr. 18, 2019, 9 pages.

*Primary Examiner* — Rexford N Barnie
*Assistant Examiner* — Swarna N Chowdhuri
(74) *Attorney, Agent, or Firm* — Kinney & Lange, P.A.

(57) ABSTRACT

A T-junction circuit comprises a first connector, a second connector, a third connector, at least one data bus, a power bus, and power conditioning circuitry. The at least one data bus is communicatively coupled to the first, second, and third connector. The power bus electrically coupled to the first, second, and third connector, the power bus configured to provide power from the first connector. The power conditioning circuitry is electrically coupled between a node of the power bus and the third connector, the node of the power bus located between the first, second, and third connectors, the power conditioning circuitry configured to condition the power provided by the power bus from the first connector before providing it to the third connector.

20 Claims, 3 Drawing Sheets

(56) References Cited

U.S. PATENT DOCUMENTS

| | | | |
|---|---|---|---|
| 2005/0223260 A1* | 10/2005 | Kinstler | G06F 11/0745 |
| | | | 713/340 |
| 2018/0079482 A1* | 3/2018 | Ivans | B64C 1/00 |
| 2018/0343761 A1* | 11/2018 | McBride | H05K 7/1432 |
| 2019/0055021 A1* | 2/2019 | Ivans | B64D 9/003 |
| 2019/0385057 A1* | 12/2019 | Litichever | G06N 3/08 |

FOREIGN PATENT DOCUMENTS

| | | |
|---|---|---|
| WO | WO 02068253 A1 | 9/2002 |
| WO | WO 2012121831 A1 | 9/2012 |

* cited by examiner

IN-LINE POWER CONDITIONING FOR MULTI-DROP DATA BUS

BACKGROUND

Aircraft health monitoring and avionics systems typically use United States Military Standard MIL-STD-704 Aircraft Electrical Power Characteristics compliant power. This power is noisy and subject to surges and interrupts, making it incompatible with power sensitive devices. Aircraft health monitoring designs use digital systems where digitization and processing is performed by smart sensors close to the source of analog input. These smart sensors can be connected together on a multi-point digital bus, allowing for one bus interface at a host to connect with one or many sensors. Smart sensors are power sensitive devices and are not compatible with the United States Military Standard MIL-STD-704 Aircraft Electrical Power Characteristics compliant power.

To address this, aircraft systems condition the input aircraft power to remove noise, voltage spikes, and provide power hold up to prevent voltage interrupts from interfering with system operation. Such power conditioning circuits consume space and generate heat proportional to the level of power they are conditioning. Power conditioning is typically conditioned by a central power conditioner at the host or locally for each smart sensor. Power conditioning at the host requires the host power conditioning to be sized appropriately for the bus, which limits scalability. This also requires power to be wired from the host to all sensors, rather than sourced from the closest United States Military Standard MIL-STD-704 Aircraft Electrical Power Characteristics compliant power. When the smart sensors condition power locally, the size of the sensor increases and the sensor is subject to heat generated by power conditioning.

SUMMARY

In one example, a T-junction circuit comprises a first connector, a second connector, a third connector, at least one data bus, a power bus, and power conditioning circuitry. The at least one data bus is communicatively coupled to the first, second, and third connector. The power bus is electrically coupled to the first, second, and third connector. The power bus is configured to provide power from the first connector. The power conditioning circuitry is electrically coupled between a node of the power bus and the third connector. The node of the power bus is located between the first, second, and third connectors. The power conditioning circuitry is configured to condition the power provided by the power bus from the first connector before providing it to the third connector.

In one example, a method comprises receiving power at a first connector of a T-junction circuit; providing the power to a second connector of a T-junction circuit using a power bus of the T-junction circuit; conditioning the power using power conditioning circuitry of the T-junction circuit to produce conditioned power; and providing the conditioned power to a third connector of the T-junction circuit using the power bus.

DETAILED DESCRIPTION

Apparatus, systems, and associated methods relate to in-line power conditioning. Using the apparatus, systems, and associated methods herein, allows for power conditioning at an aircraft power line closest to a smart sensor or other power sensitive device. This avoids the need to condition power at the host or at the power sensitive devices themselves. This allows for the use of smaller sensors without the need to run power lines directly from a host to all sensitive devices of the aircraft. Additionally, this allows power conditioning circuits to be scaled to the need of each device, taking up less space and generating less heat locally.

Figure 1:
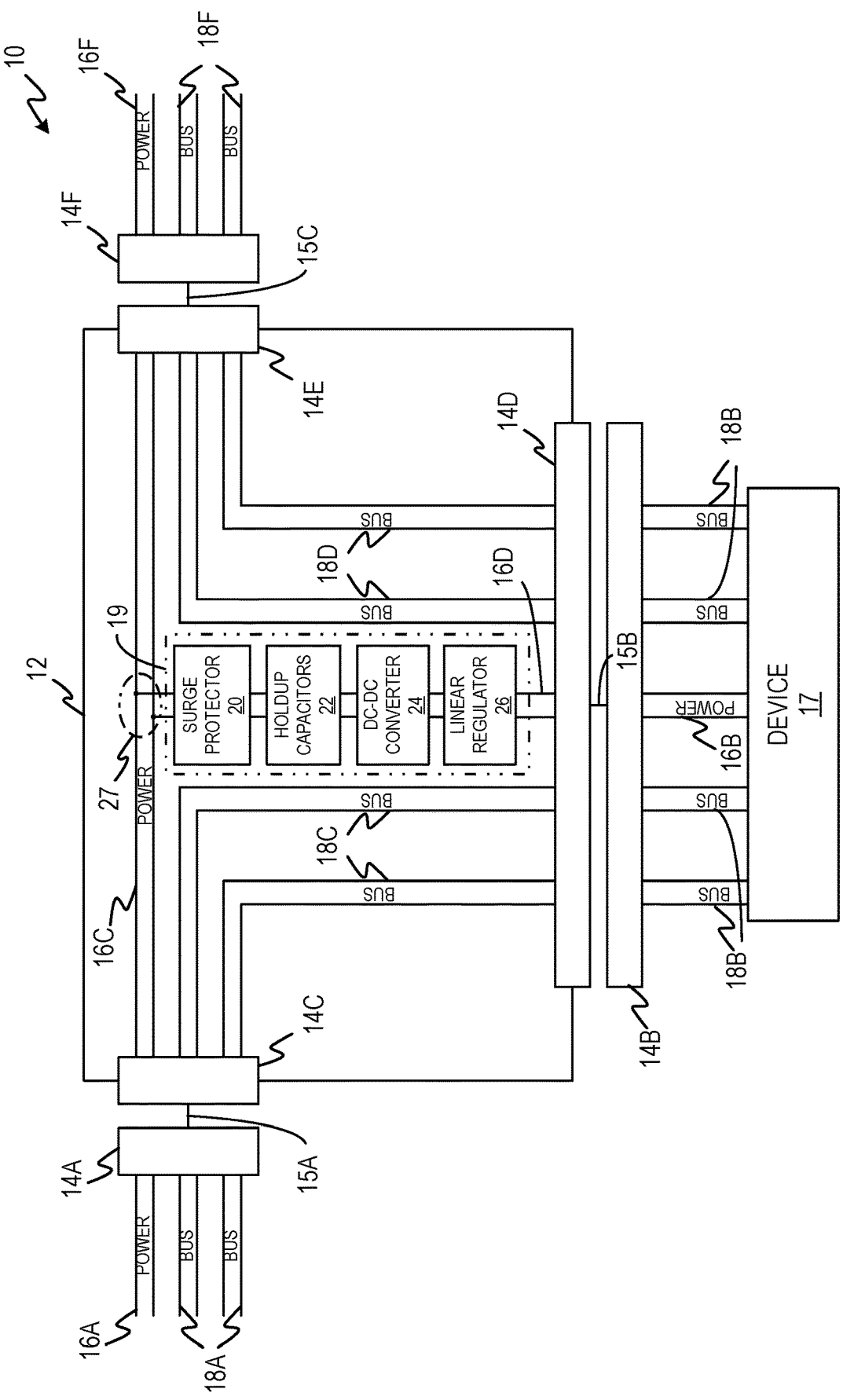
FIG. 1 is a block diagram of a first example of in-line power conditioning circuitry.

FIG. 1 is a block diagram of in-line power conditioning circuitry 10 including T-junction circuitry 12; connectors 14A, 14B, and 14F; power buses 16A, 16B and 16F; and data buses 18A, 18B, and 18F. T-junction circuitry 12 includes connectors 14C, 14D and 14E; connection lines 15A-15C; power buses 16C and 16D; device 17; data buses 18C and 18D; and power conditioning circuitry 19. Power conditioning circuitry includes surge protector circuitry 20, holdup capacitor circuitry 22, direct current to direct current (DC-DC) converter circuitry 24, and linear regulator circuitry 26. Power bus 16C includes power bus node 27.

Power bus 16A and data buses 18A connect to a host. The host can be an aircraft controller or other device for communicating with sensors and providing United States Military Standard MIL-STD-704 Aircraft Electrical Power Characteristics compliant power. Power bus 16A provides United States Military Standard MIL-STD-704 Aircraft Electrical Power Characteristics compliant power. Connector 14A connects to connector 14C, as shown by communication line 15A, to provide United States Military Standard MIL-STD-704 Aircraft Electrical Power Characteristics compliant power to power bus 16C and to connect data buses 18A to data buses 18C. Power bus 16B and data buses 18B connect to device 17. Device 17 can be a smart sensor or other power sensitive device. Connector 14B connects to connector 14D, as shown by connection line 15B, to connect power bus 16B to power bus 16D. Connector 14B connects to connector 14D to further connect data buses 18B to data buses 18D. Connector 14E connects to connector 14F, as shown by communication line 15C, to connect power bus 16C and data buses 18D to power bus 16F and data buses 18F respectively. Power bus 16F and data buses 18F connect to another T-junction circuit, the host, or other device.

Data buses 18A, 18B, 18C, and 18F can be wires or optical fiber. Connectors 14A-14F can be any combination of pigtail connectors, pin and socket connectors, optical couplers, or other bus connectors. Holdup capacitor circuit 22 can include any combination of tantalum capacitors, ceramic capacitors, electrolytic capacitors, super capacitors, or another type of capacitor.

T-junction circuitry 12 allows device 17 to connect to the nearest United States Military Standard MIL-STD-704 Aircraft Electrical Power Characteristics compliant power and data bus. T-junction circuitry 12 conditions power it receives at connector 14C using power conditioning circuitry 19 and provides conditioned power to power bus 16B through connector 14D. Surge protector circuitry 20 protects power sensitive devices from voltage spikes. Surge protector circuitry 20 clamps the voltage, preventing voltage and power spikes from passing to power bus 16B. Surge protector circuitry 20 also prevents reverse current conditions during voltage drops on power bus 16A. Holdup capacitor circuitry 22 prevents voltage drops or power interruptions from passing to power bus 16B. Holdup capacitor circuitry 22 stores power and provides that power to power bus 16B during power interruption or voltage drops. DC-to-DC converter 24 converts the voltage of power bus 16A to a voltage compatible with the power sensitive device connected to power bus 16B. Linear regulator 26 maintains a steady voltage output to power bus 16B. Linear regulator 26 varies its resistance to maintain the steady output voltage. Linear regulator 26 also provides over current protection by increasing its resistance in response to increased current and/or voltage conditions.

Figure 2:
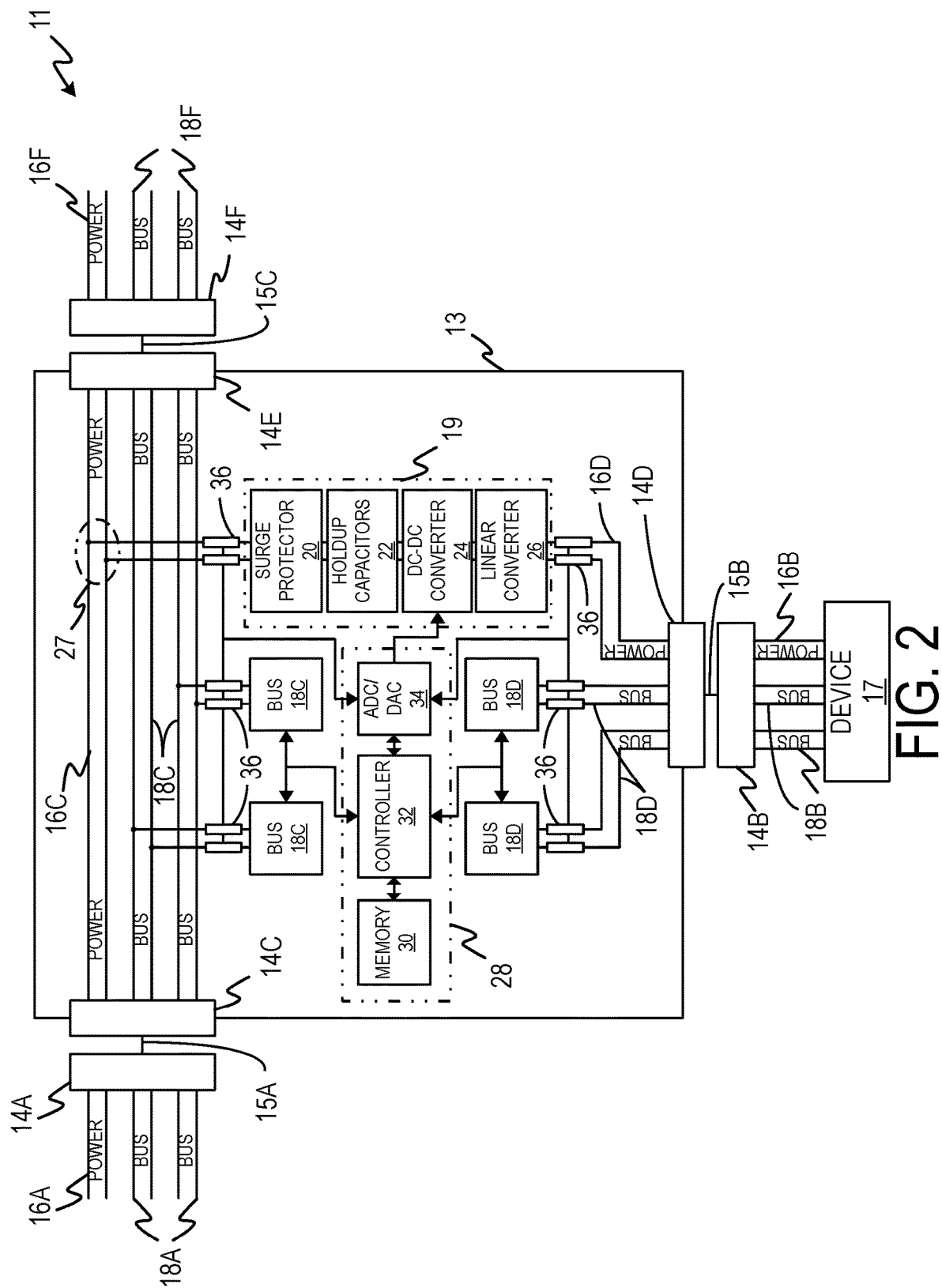
FIG. 2 is a block diagram of a second example of in-line power conditioning circuitry.

FIG. 2 is a block diagram of in-line power conditioning circuit 11 including T-junction circuitry 13; connectors 14A, 14B and 14F; connection lines 15A-15C; power buses 16A, 16B, and 16F; device 17; and data buses 18A, 18B, and 18F. T-junction circuitry 13 includes connectors 14C, 14D, and 14E; power buses 16C and 16D; data buses 18C and 18D; power conditioning circuitry 19; control circuitry 28; and voltage/current sensors 36. Power bus 16C includes power bus node 27. Power conditioning circuitry includes surge protector circuitry 20, holdup capacitor circuitry 22, DC-DC converter circuitry 24, and linear regulator circuitry 26. Control circuitry 28 includes memory 30, controller 32, and analog-to-digital/digital-to-analog converter (ADC/DAC) 34.

T-junction circuitry 13 of in-line power conditioning circuit 11 includes control circuitry 28 and voltage/current sensors 36 that are not included in T-junction circuitry 12 of in-line power conditioning circuit 10. T-junction circuitry 13 also differs from T-junction circuitry 12 in that there is a direct connection of data buses 18C from connecter 14C to connector 14E. Voltage/current sensors 36 sense the voltage and current of power bus 16C and data buses 18C and 18D. The ADC of ADC/DAC 34 receives the sensed voltage and current as an analog signal and converts it to a digital signal. ADC/DAC 34 provides the digital signal to controller 32. Controller 32 provides a digital control signal to configure the output voltage of DC-DC converter circuitry 24. ADC/DAC 34 receives the digital control signal and converts it to an analog control signal, and provides the analog control signal to DC-DC converter circuitry 24. Controller 32 can send and receive data through data buses 18C and 18D. Controller 32 repeats data received through data bus 18C to data bus 18D and vice versa. In some examples, controller 32 filters and/or adds data to the repeated data. Controller 32 can provide the digital control signal based upon a sensed voltage or current from voltage/current sensors 36 on power bus 16C. Controller 32 can provide the digital control signal based upon commands received from a power sensitive device or from the host on data buses 18A.

Controller 32 can be one or more processors, microprocessors, digital signal processors, or an FPGA, for example. Controller 32 is configured to execute software programs stored in memory 30. When controller 32 is an FPGA, programs are executed with hardware configurations. Memory 30 is configured to store software programs as well as parameters and data during program execution. Memory 30 is a computer readable storage media. Computer readable storage media may include read-only memory (EEPROM), random access memory, solid-state memory, etc.

Figure 3:
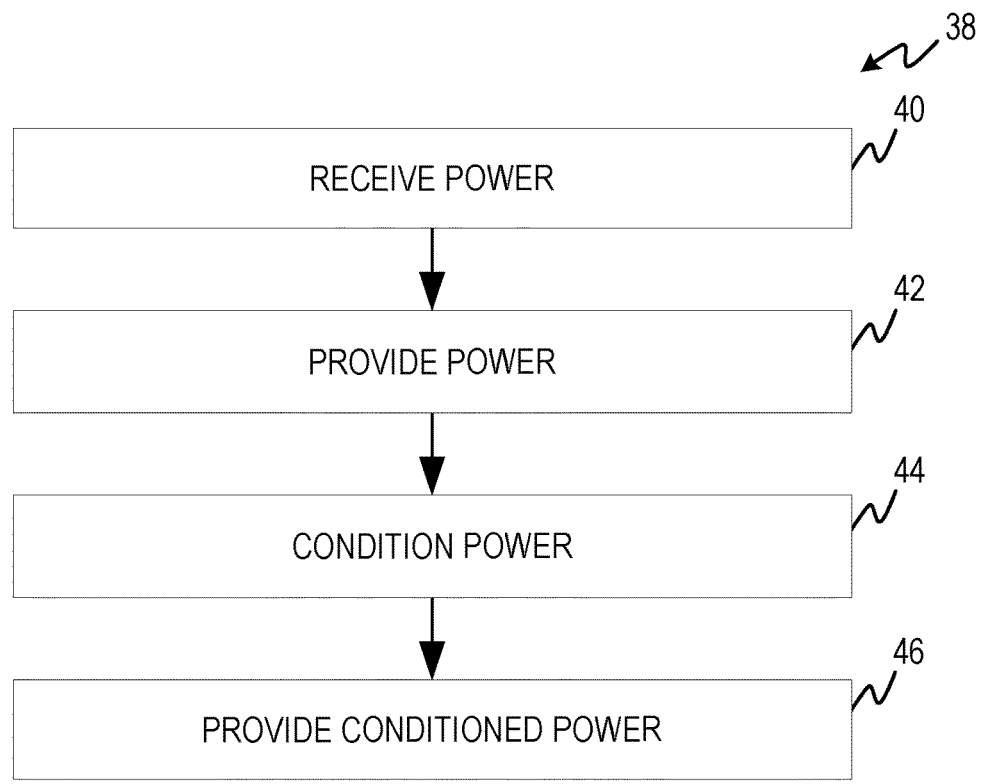
FIG. 3 is a flow diagram for an in-line power conditioning process.

FIG. 3 is a flow diagram for in-line power conditioning process 38. For purposes of clarity and ease of discussion, in-line power conditioning process 38 is discussed within the context of in-line power conditioning circuit 11 of FIG. 2.

At step 40, power is received at connector 14C. At step 42, power is provided to a connector 14E using power bus 16C. At step 44, the power is conditioned by power conditioning circuitry 19. In some examples, power conditioning includes clamping voltage spikes of the power, preventing reverse current flow of the power, providing current, converting the power from a first voltage to a second voltage, and maintaining the second voltage. Voltage spikes are clamped using surge protector circuitry 20. Current flow from power conditioning circuitry 19 to connectors 14C and 14E is prevented using surge protector circuitry 20. Current is provided using holdup capacitor circuitry 22 in response to the voltage of the power dropping. The power is converted from a first voltage to a second voltage using direct current to direct current (DC-DC) converter circuitry 24. The second voltage is maintained using linear regulator circuitry 26. At step 46, the conditioned power is provided to connector 14D using power bus 16D.

Accordingly, implementing techniques of this disclosure, in-line power conditioning can be used provide conditioned power to power sensitive devices. Using in-line power conditioning as described herein, power conditioning can be done at closest analog power line and scale for individual power sensitive device use. This allows for smaller sensors that are not subject to the heat generated by power conditioning. Additionally, this allows for remote power conditioning that is not supplied by a large central power conditioner with cables running from the central power conditioner to each power sensitive device.

DISCUSSION OF POSSIBLE EMBODIMENTS

[K&L is to reproduce all claims in the specification in a manner that will support multiply-dependent claims later filed in Europe, i.e., all dependent claims should be rewritten to recite, e.g., "in any of the foregoing xyz embodiments, the xyz may additionally or alternatively include . . . "]

The following are non-exclusive descriptions of possible embodiments of the present invention.

A T-junction circuit can comprise a first connector; a second connector; a third connector; at least one data bus communicatively coupled to the first, second, and third connector; a power bus electrically coupled to the first, second, and third connector, the power bus configured to provide power from the first connector; and power conditioning circuitry electrically coupled between a node of the power bus and the third connector, the node of the power bus located between the first, second, and third connectors, the power conditioning circuitry configured to condition the power provided by the power bus from the first connector before providing it to the third connector.

The T-junction circuit of the preceding paragraph can optionally include, additionally and/or alternatively, any one or more of the following features, configurations and/or additional components:

The power conditioning circuitry can comprise surge protector circuitry configured to clamp voltage spikes, and prevent current flow from the power conditioning to the first and second connectors; holdup capacitor circuitry configured to provide current during voltage drops of the power, and direct current to direct current (DC-DC) converter circuitry configured to convert the power from a first voltage to a second voltage.

The power conditioning circuitry can further comprise linear regulator circuitry configured to maintain a voltage of the conditioned power.

A voltage/current sensor configured to sense a voltage and a current of the power bus; and control circuitry configured to receive the sensed voltage and current of the power bus; and provide control to the DC-DC converter based on the sensed voltage and current of the power bus.

The control circuitry can comprise a controller configured to determine a fault based upon the sensed voltage and current, send and receive data via the at least one data bus, and provide a digital DC-DC control signal; and an analog-to-digital/digital-to-analog converter (ADC/DAC) configured to convert the digital DC-DC control signal to an analog DC-DC control signal, and convert the sensed voltage and current to a digital signal.

The controller can be a fully programmable gate array (FPGA).

The voltage/current sensor can be a resistor.

The power provided by the power bus can be United States Military Standard MIL-STD-704 Aircraft Electrical Power Characteristics compliant power.

The power conditioning circuitry can be configured to provide conditioned power for use by a smart sensor.

The first, second, and third connectors can be pigtail connectors.

A method can comprise receiving power at a first connector of a T-junction circuit; providing the power to a second connector of a T-junction circuit using a power bus of the T-junction circuit; conditioning the power using power conditioning circuitry of the T-junction circuit to produce conditioned power; and providing the conditioned power to a third connector of the T-junction circuit using the power bus.

The method of the preceding paragraph can optionally include, additionally and/or alternatively, any one or more of the following features, configurations and/or additional components:

Conditioning the power can comprise clamping voltage spikes of the power using surge protector circuitry; preventing current flow from the power conditioning to the first and second connectors using the surge protector circuitry; providing current using holdup capacitor circuitry in response to the voltage of the power dropping; and converting the power from a first voltage to a second voltage using direct current to direct current (DC-DC) converter circuitry.

Sensing a voltage and a current of the power bus using a voltage/current sensor of the T-junction circuit; and receiving the sensed voltage and current of the power bus at control circuitry of the T-junction circuit.

Converting the sensed voltage and current to a digital signal using an analog-to-digital/digital-to-analog converter (ADC/DAC).

Determining a fault based upon the sensed voltage and current using a controller of the control circuitry; and transmitting, using the controller, a fault signal to a host via at least one data bus of the T-junction circuit.

Providing control to the DC-DC converter using control circuitry.

Providing control to the DC-DC converter can comprise providing a digital DC-DC control signal using the controller; and converting the digital DC-DC control signal to an analog DC-DC control signal using an analog-to-digital/digital-to-analog converter (ADC/DAC) of the control circuitry.

Receiving an operating voltage from a smart sensor via at least one data bus of the T-junction circuit using the controller; and adjusting the second voltage of the DC-DC converter using the controller.

Maintaining the second voltage of the converted power using linear regulator circuitry.

Providing conditioned power to a smart sensor via the third connector using the power converter circuitry.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A T-junction circuit comprising:
    a first connector;
    a second connector;
    a third connector;
    at least one data bus communicatively coupled to the first, second, and third connector;
    a power bus electrically coupled to the first, second, and third connector, the power bus configured to provide unconditioned power from the first connector and to directly connect the first and second connectors to provide the unconditioned power directly from the first connector to the second connector; and
    power conditioning circuitry electrically coupled between a node of the power bus and the third connector, the node of the power bus located between the first, second, and third connectors, the power conditioning circuitry configured to condition the unconditioned power provided by the power bus from the first connector to produce conditioned power that is provided to the third connector.

2. The T-junction circuit of claim 1, wherein the power conditioning circuity comprises:
    surge protector circuitry configured to:
        clamp voltage spikes; and
        prevent current flow from the power conditioning to the first and second connectors;
    holdup capacitor circuitry configured to provide current during voltage drops of the power; and
    direct current to direct current (DC-DC) converter circuitry configured to convert the power from a first voltage to a second voltage.

3. The T-junction circuit of claim 2, the power conditioning circuitry further comprising linear regulator circuitry configured to maintain a voltage of the conditioned power.

4. The T-junction circuit of claim 2, further comprising:
    a voltage/current sensor configured to sense a voltage and a current of the power bus; and
    control circuitry configured to:
        receive the sensed voltage and current of the power bus; and
        provide control to the DC-DC converter based on the sensed voltage and current of the power bus.

5. The T-junction circuit of claim 4, wherein the control circuitry comprises:
    a controller configured to:
        determine a fault based upon the sensed voltage and current;
        send and receive data via the at least one data bus; and
        provide a digital DC-DC control signal; and an analog-to-digital/digital-to-analog converter (ADC/DAC) configured to:
  convert the digital DC-DC control signal to an analog DC-DC control signal; and
  convert the sensed voltage and current to a digital signal.

6. The T-junction circuit of claim 5, wherein the controller is a fully programmable gate array (FPGA).

7. The T-junction circuit of claim 4, wherein the voltage/current sensor is a resistor.

8. The T-junction circuit of claim 1, wherein the power provided by the power bus is United States Military Standard MIL-STD-704 Aircraft Electrical Power Characteristics compliant power.

9. The T-junction circuit of claim 1, wherein the power conditioning circuitry is configured to provide conditioned power for use by a smart sensor.

10. The T-junction circuit of claim 1, wherein the first, second, and third connectors are pigtail connectors.

11. A method comprising:
  receiving unconditioned power at a first connector of a T-junction circuit;
  providing the unconditioned power to a second connector of a T-junction circuit using a power bus of the T-junction circuit, wherein the power bus directly connects the first and second connectors to provide the unconditioned power directly from the first connector to the second connector;
  conditioning the unconditioned power using power conditioning circuitry of the T-junction circuit to produce conditioned power; and
  providing the conditioned power to a third connector of the T-junction circuit using the power bus.

12. The method of claim 11, wherein conditioning the power comprises:
  clamping voltage spikes of the power using surge protector circuitry;
  preventing current flow from the power conditioning to the first and second connectors using the surge protector circuitry;
  providing current using holdup capacitor circuitry in response to the voltage of the power dropping; and
  converting the power from a first voltage to a second voltage using direct current to direct current (DC-DC) converter circuitry.

13. The method of claim 12, the method further comprising:
  sensing a voltage and a current of the power bus using a voltage/current sensor of the T-junction circuit; and
  receiving the sensed voltage and current of the power bus at control circuitry of the T-junction circuit.

14. The method of claim 13, further comprising converting the sensed voltage and current to a digital signal using an analog-to-digital/digital-to-analog converter (ADC/DAC).

15. The method of claim 14, further comprising:
  determining a fault based upon the sensed voltage and current using a controller of the control circuitry; and
  transmitting, using the controller, a fault signal to a host via at least one data bus of the T-junction circuit.

16. The method of claim 12, the method further comprising providing control to the DC-DC converter using control circuitry.

17. The method of claim 16, wherein providing control to the DC-DC converter comprises:
  providing a digital DC-DC control signal using the controller; and
  converting the digital DC-DC control signal to an analog DC-DC control signal using an analog-to-digital/digital-to-analog converter (ADC/DAC) of the control circuitry.

18. The method of claim 17, further comprising:
  receiving an operating voltage from a smart sensor via at least one data bus of the T-junction circuit using the controller; and
  adjusting the second voltage of the DC-DC converter using the controller.

19. The method of claim 12, further comprising maintaining the second voltage of the converted power using linear regulator circuitry.

20. The method of claim 11, further comprising providing conditioned power to a smart sensor via the third connector using the power converter circuitry.

* * * * *